United States Patent [19]

Coy, Jr. et al.

[11] Patent Number: 4,512,534
[45] Date of Patent: Apr. 23, 1985

[54] CASSETTE REEL LOCK

[75] Inventors: Don R. Coy, Jr., Palatine; Peter M. Giannis, Arlington Heights, both of Ill.

[73] Assignee: T/B & H Home Video, Northbrook, Ill.

[21] Appl. No.: 407,501

[22] Filed: Aug. 12, 1982

[51] Int. Cl.³ .................. G03B 1/04; G11B 15/32
[52] U.S. Cl. .................................................. 242/198
[58] Field of Search ........................ 242/197–200; 360/93, 96.1, 132; 352/72, 78 R

[56] References Cited

U.S. PATENT DOCUMENTS

| 4,195,797 | 4/1980 | Okamura et al. | 242/199 |
| 4,232,840 | 11/1980 | Sugawara | 242/198 |
| 4,288,048 | 9/1981 | Sieben | 242/198 |

FOREIGN PATENT DOCUMENTS

| 1384827 | 2/1975 | United Kingdom | 242/198 |
| 1587148 | 4/1981 | United Kingdom | 242/198 |
| 2099400 | 12/1982 | United Kingdom | 242/198 |

Primary Examiner—Leonard D. Christian
Attorney, Agent, or Firm—Lockwood, Alex, FitzGibbon & Cummings

[57] ABSTRACT

A locking mechanism for the reels of a tape cassette includes a pair of reel locks which are rotatable between reel engaging and disengaging positions and a spring on each of the reel locks for returning the reel locks to their reel engaging positions. The spring includes a resilient arm having one end which is formed in integral, one-piece relationship to a bushing of each of the reel locks, the bushing permitting rotation of the reel locks. The resilient arm of each reel lock extends at an angle to each of the reel locks and the other end of each arm is free and unattached and the arms slidably engage stationary portions of the cassette housing to cause the spring return action.

10 Claims, 5 Drawing Figures

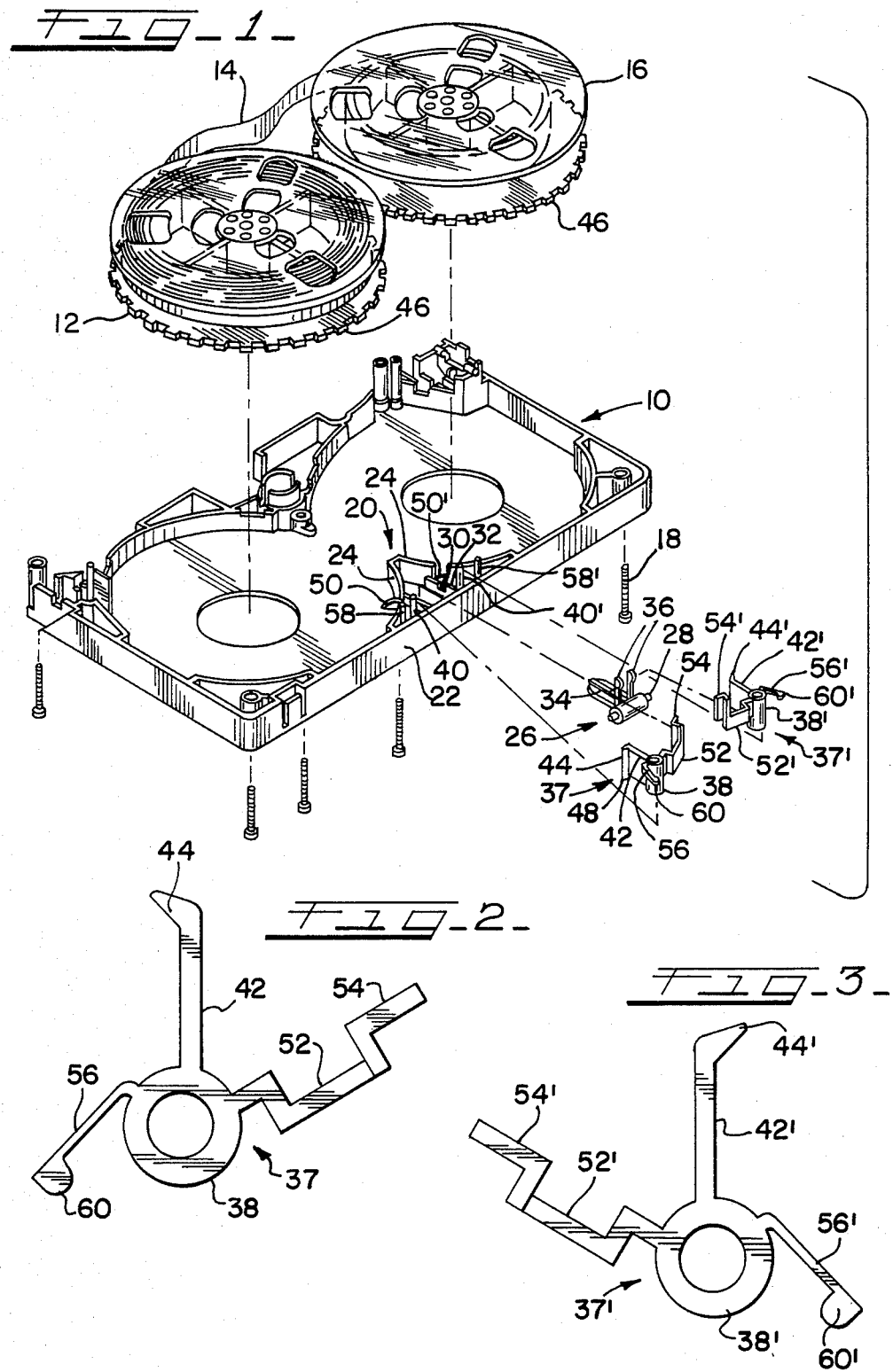

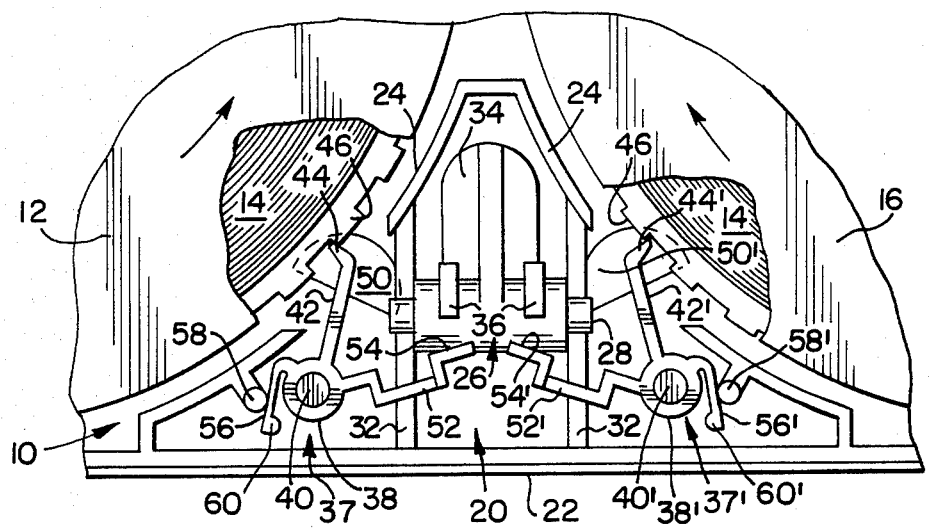
FIG-4-
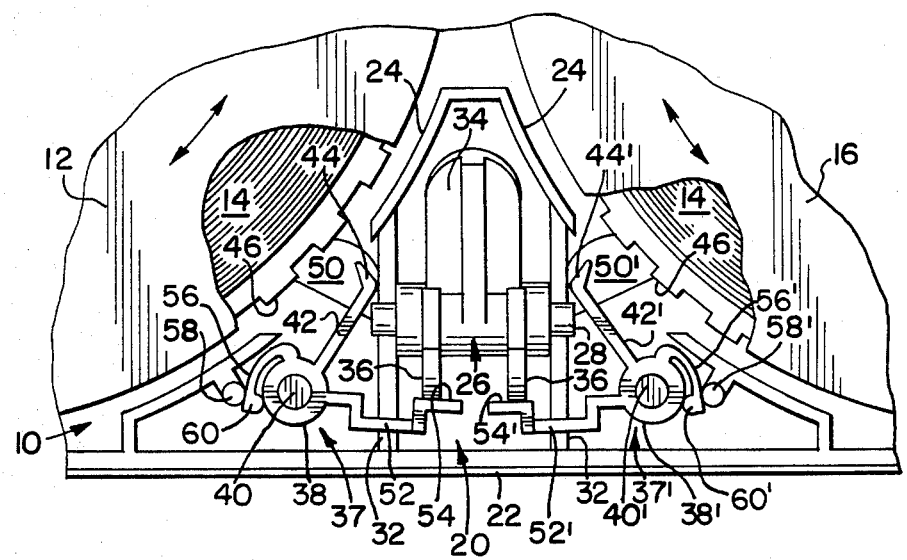
FIG-5-

CASSETTE REEL LOCK

BACKGROUND AND SUMMARY OF THE INVENTION

The present invention relates to a cassette reel lock and, more particularly, to an improved reel lock and locking mechanism for locking the reels of a tape cassette.

Various locking mechanisms have been employed in the past for locking the reels of video tape cassettes when the cassettes are not installed in the recording or playback machines, for example, when the cassettes are being transported. Such locking mechanisms prevent the accidental unwinding and tangling of the tape when the cassettes are not in use.

Several prior reel locking mechanisms are disclosed, by way of example, in U.S. Pat. Nos. 4,195,797 and 4,232,840. These prior locking mechanisms employ locking members which are rotatable into and out of reel engagement and are urged into the reel engaging position by separately installed metal springs. Such separately installed springs have several disadvantages. They require increased inventory of parts and the manipulation and installation of both the separate reel locks and the springs require separate steps. In certain of these prior locking mechanisms, the springs are extremely tiny. Thus, the springs are difficult to manipulate by hand, and are virtually impossible to install by automated procedures. Moreover, the presence of multiple, separate pieces results in increased material and installation costs and increases the possibility that the pieces may become separated after installation, either in transportation, in use, or if the cassette housing is taken apart for any reason after it has been assembled.

The aforementioned U.S. Pat. No. 4,232,840 recognized the disadvantages of installation encountered in the prior locking mechanisms which utilized either tiny separate springs or large individual springs. In an attempt to overcome these installation problems occasioned by such separate elements, this Letters Patent disclosed locking mechanisms in which both of the reel locks were joined together by a single relatively large resilient element which was molded integrally with and joined both of the reel locks so as to form a single element containing both of the reel locks and the resilient element. This interconnecting resilient element formed the spring for both reel locks.

However, this single, integral reel locking mechanism also suffers several disadvantages. One disadvantage occurs in the installation of the element in the cassette. Careful manipulation is required both to insure simultaneous positioning of both reel locks due to the fact that they are attached together, and also to insure that the resilient element which forms the spring and joins the reel locks is properly positioned and does not interfere with or disrupt the other locking mechanism elements. This is because the resilient spring element which couples both of the reel locks is of considerable size and occupies a substantial portion of the already restricted and compact area which is available for the locking mechanism. Another disadvantage is that a substantial force must be exerted on the locking mechanism to move the reel locks from the reel engaging to the disengaging position. This is due to the simultaneous action of the single resilient spring on both of the locks, the location at which the spring is coupled to the locks, the direction in which the spring forces bear against the locks, and the size of the spring itself.

A locking mechanism incorporating the principles of the present invention overcomes these several aforementioned disadvantages. A locking mechanism incorporating the principles of the present invention eliminates the need for separate reel locks and springs and, thus, reduces the number of parts. Such reduction in the number of parts in the present invention reduces both material and installation costs, reduces the amount of parts needed to be kept in inventory, and not only facilitates hand assembly of these mechanisms, but also facilitates assembly of these mechanisms by automated procedures. A locking mechanism incorporating the principles of the present invention also reduces the likelihood of separation of parts, either in use, in transportation or upon disassembly of the casing. A locking mechanism incorporating the principles of the present invention may be readily installed in previously configured cassette housings without the need for any redesign of such housings to accept the reel locks and mechanisms. A locking mechanism incorporating the principles of the present invention is operable with a minimum of force and under the environmental conditions normally encountered by tape cassettes and is spaced from and located relative to the locking mechanism elements so as not to interfere with their operation.

In one principal aspect of the present invention, a reel locking mechanism for a tape cassette comprises at least one cassette housing half, a reel lock having means for engaging a reel in the cassette to prevent rotation of the reel, and mounting means for stationarily mounting the reel lock on the housing half, but allowing rotation of the reel lock on the housing half between reel engaging and disengaging positions. Spring means includes a resilient arm extending angularly to the reel lock and having one end formed in integral, one-piece relationship to the reel lock. The other end of the arm is free and unattached. Spring engaging means is mounted stationarily on the housing half and the resilient arm slidably contacts the spring engaging means when the reel lock is rotated between the reel engaging and disengaging positions to urge the reel lock toward the reel engaging position.

In another principal aspect of the present invention, the aforementioned reel locking mechanism includes a pair of such reel locks for respectively engaging each of the reels in the cassette. Each of the reel locks includes one of the resilient arms and each of the resilient arms operates independently of each other to urge their respective reel locks toward the reel engaging positions of each reel.

These and other objects, features and advantages of the present invention will be clearly understood through a consideration of the following detailed description.

BRIEF DESCRIPTION OF THE DRAWINGS

In the course of this description, reference will frequently be made to the attached drawings in which:

FIG. 1 is an overall perspective, exploded view of the bottom half of a video tape cassette showing a preferred embodiment of locking mechanism constructed in accordance with the principles of the present invention;

FIG. 2 is a plan view of one of the reel locks incorporating the principles of the present invention and as shown on the left in FIG. 1;

FIG. 3 is a plan view of the other one of the reel locks incorporating the principles of the present invention and as shown on the right in FIG. 1;

FIG. 4 is a broken plan view of a portion of the bottom half of the video cassette housing as shown in FIG. 1 with the several elements installed in the housing and showing the locking mechanism in its reel engaging and locking position; and FIG. 5 is a broken plan view, similar to the view shown in FIG. 4, but showing the locking mechanism in its reel disengaged and unlocked position.

DESCRIPTION OF THE PREFERRED EMBODIMENT

A preferred embodiment of the present invention is shown generally in FIG. 1. Referring to FIG. 1, the video cassette generally includes a housing bottom half 10, a left reel 12 having a video tape 14 stored thereon in readiness for play, a right pickup reel 16, a housing top half (not shown), and a plurality of screws 18 for attaching the bottom and top halves of the housing together. The interior of the housing includes a number of features which are common generally to video tape cassettes and which will not be described herein in detail because they do not constitute important features of the present invention.

The present invention resides in the reel locking mechanism which is generally indicated in the area denoted by 20 in the drawings. This locking mechanism automatically locks the reel when the cassette is out of the recording or playback machine to prevent accidental unwinding and tangling of the tape, but automatically unlocks the reels when the cassette is placed in the machine. The locking mechanism is preferably contained in an area of the bottom half 10 of the housing defined by the rear wall 22 of the bottom half of the housing and curved interior partitions 24 in the housing.

The locking mechanism includes a lock retractor 26 which is pivotally mounted for rotation by pins 28 in notches 30 in upright, spaced, parallel walls 32 in the housing, as best seen in FIGS. 1, 4 and 5. The lock retractor 26 also includes a generally horizontally extending arm 34 and a pair of spaced, upwardly extending actuating arms 36, as best seen in FIGS. 1, 4 and 5. The horizontally extending arm 34 overlies an opening (not shown) in the bottom half of the housing 10 through which an actuating pin or other element (not shown) in the recording and playback machine extends when the cassette is installed in the machine to bear upwardly against the horizontally extending arm 34. The pin causes the lock retractor 26 to rotate about pins 28 to unlock the locking mechanism as shown in FIG. 5 when the cassette is positioned in the machine.

The reel locks of the present invention include both left and right reel locks as shown in FIGS. 2 and 3, respectively. Each of these reel locks are substantially identical in construction, but are substantially mirror images of each other. Accordingly, the left reel lock 37 only will be described and the reference numerals employed in the description of the left reel lock shown in FIG. 2 will also be employed to designate like elements in the right reel lock 37' in FIG. 3, except that the numerals in the right reel lock are primed.

The reel lock 37 includes a generally cylindrical, vertical bushing 38 which is adapted to be slipped over a pin 40. The pin 40 is stationarily mounted to the bottom wall of the bottom half of the housing 10 and extends upwardly from the bottom wall, as best shown in FIGS. 1, 4 and 5. Thus, the pin 40 stationarily mounts the reel lock 37 to the housing half 10, but the bushing 38 permits rotation of the reel lock about an axis defined by the pin 40.

The reel lock 37 also includes a reel engaging arm 42 which extends outwardly from the bushing 38 and includes a reel engaging hooked tip 44 which is adapted to engage teeth 46 on the respective reels 12 and 16, as best shown in FIG. 4. The hooked tip 44 of the reel engaging arm 42 is shaped to provide a ratchet action, i.e. when engaged with the reels it will allow the reels to rotate in the direction indicated by the single headed arrows in FIG. 4, but will prevent rotation in the opposite tape unwinding direction. The lower end of the hooked tip 44 preferably extends at 48 slightly beneath the average height of the arm 42 as shown in FIG. 1 and this extension projects into a shallow recess 50 in the bottom wall of the bottom half 10 as best shown in FIGS. 4 and 5. The recess 50 insures engagement of hooked tip 44 with the teeth 46 on reels 12 and 16.

The reel lock 37 also includes an actuating arm 52 which extends from the bushing 38 in angularly spaced relationship to the reel engaging arm 42. Actuating arm 52 includes a vertically extending bearing surface 54 at its outer end which is positioned to be engaged by one of the actuating arms 36 of the lock retractor 26, as shown in FIG. 5, to rotate the reel lock from its reel engaging and locking position, as shown in FIG. 4, to its disengaging and unlocking position, as shown in FIG. 5.

The bushing 38, reel engaging arm 42 and actuating arm 52 are preferably all formed in integral, one-piece construction with each other by suitable means, such as injection molding or the like.

The locking mechanism and reel lock which have thus far been described are essentially conventional in the art. The improvement in the present invention is in the spring mechanism for automatically urging the reel locks to the reel engaging and locking position when they have been rotated from this position.

Such spring mechanism in the preferred form of the present invention comprises a resilient arm 56 which at one end is also formed in integral, one-piece relationship to the bushing 38 and extends outwardly from the bushing in angular and spaced relationship to the arms 42 and 52. The opposite end of the resilient arm 56 is suspended free and unattached as shown. The resilient arm 56 extends in a direction so as to slidably engage a spring engaging pin 58 formed stationarily on the cassette housing and extending upwardly from the bottom housing half 10 as shown in FIGS. 1, 4 and 5. In the reel engaging position, the arm 56 is preloaded against pin 58. However, when the reel lock 37 is rotated about pin 40 to the reel disengaging position, as shown in FIG. 5, the outer surface of the resilient arm 56 bears slidably against pin 58 and is placed under further tension in readiness to return the reel lock 37 to the reel engaging and locking position. Because both of the resilient arms 56 and 56' are free and unattached to each other or to the respective reel locks 37 and 37', they urge their respective reel locks toward the reel engaging position independently of each other. Such independent operation assists in reducing the amount of force needed to move the reel locks out of the reel engaging position, yet they produce ample force to return the respective reel locks 37 and 37' to their reel engaging positions.

The resilient arm 56 preferably includes a somewhat enlarged portion 60 adjacent its tip. The size of the enlarged portion need not be particularly critical. Its principal purpose is to provide a bearing surface during molding of the reel lock 37 to assist in ejection of the reel lock and its arm 56 from the mold. However, if it is desired to restrict the degree of rotation of the reel lock in the cassette in its reel disengaging position by utilizing the enlarged portion 60, rather than by contact of the back side of the tip 44 of the reel engaging arm 42 with wall 32 as shown in FIG. 5, the size of the enlarged portion 60 may be selected to be at least as large as the distance between spring engaging pin 58 and the adjacent outer surface of the bushing 38 of the reel lock. In such case, the degree of rotation of the reel lock 37 will be limited by the enlarged portion 60 moving between pin 58 and bushing 38 to prevent further rotation.

Although the reel lock of the preferred embodiment of the present invention may be formed of any one of a wide range of materials, including metals, thermoplastic polymers are perferred and, of such polymers, acetal resins, such as Delrin, are particularly preferred. It has been found that these polymers are of sufficient strength, yet also exhibit excellent resiliency to allow operation of the reel lock with minimum forces and at the temperatures typically encountered by the cassettes in environments both in and out of the recording and playback machines.

It will be seen that the locking mechanism of the present invention realizes a substantial reduction in the number of pieces needed relative to the locks and mechanisms of the prior art. Thus, material and installation costs are reduced and the likelihood of separation of additional pieces in use, transportation or disassembly of the cassette is minimized. Such reduction in the number of pieces not only facilitates hand assembly of the cassettes, but also makes possible the use of automated procedures in the assembly of the cassettes. Automated procedures either could not previously be utilized where separate metal springs were employed or could be accomplished only with difficulty and care. Moreover, the reel locks and locking mechanisms incorporating the principles of the invention are fully acceptable for installation in the cassette housing previously in use without the need to modify these housings. Moreover, because the resilient arm 56 is short and unobtrusive, it will not interfere with the other elements of the locking mechanism, either during installation or use.

It will be understood that although the present invention has been described in terms of a video tape cassette, the principles of the present invention are equally applicable to other forms of cassettes, such as audio tape cassettes.

It will also be understood that the embodiment of the present invention which has been described is merely illustrative of one of the applications of the principles of the present invention. Numerous modifications may be made by those skilled in the art without departing from the true spirit and scope of the invention.

What is claimed is:

1. A reel locking mechanism for a tape cassette comprising:
   at least one cassette housing half;
   a reel lock having means for engaging a reel in the cassette to prevent rotation of the reel;
   mounting means including a bushing on said reel lock for stationarily mounting said reel lock on said housing half, but allowing rotation of said reel lock on said housing half between said engaging and disengaging positions;
   spring means including a resilient arm extending angularly from said bushing, and having one end formed integrally and in one-piece relationship to said bushing, the other end of said arm being free and unattached; and
   spring engaging means mounted stationarily on said housing half, said resilient arm slidably contacting said spring engaging means along the length of said arm when said reel lock is rotated between said reel engaging and disengaging positions to urge said reel lock toward said reel engaging position.

2. The locking mechanism of claim 1, wherein said bushing and said spring means are molded into said integral, one-piece relationship with each other.

3. The locking mechanism of claim 1, wherein said reel lock and said spring means are formed of a themoplastic polymer.

4. The locking mechanism of claim 3, wherein said polymer is an acetal resin.

5. The locking mechanism of claim 1, wherein said resilient arm includes an enlarged portion adjacent said other end of said arm.

6. The locking mechanism of claim 5, wherein said spring engaging means is positioned in spaced relationship to said reel lock and a predetermined distance therefrom; and said enlarged portion is at least as large as said predetermined distance to restrict rotation of said reel lock.

7. The locking mechanism of claim 1, wherein said resilient arm is formed in integral, one-piece relationship to said bushing by molding, and wherein said reel lock and said spring means are formed of a thermoplastic polymer.

8. The locking mechanism of claim 1, including a pair of reel locks for respectively engaging each of the reels in the cassette, each of said reel locks including one of said resilient arms, each of said resilient arms operating independently of each other to urge their respective reel locks toward said reel engaging positions of each reel.

9. A reel locking mechanism for a tape cassette comprising:
   at least one cassette housing half;
   a reel lock having means for engaging a reel in the cassette to prevent rotation of the reel;
   mounting means for stationarily mounting said reel lock on said housing half, but allowing rotation of said reel lock on said housing half between reel engaging and disengaging positions;
   spring means including a resilient arm extending angularly to said reel lock, and having one end formed integrally and in one-piece relationship to said reel lock, the other end of said arm being free and unattached and including an enlarged portion adjacent said other end of said arm; and
   spring engaging means mounted stationarily on said housing half, said resilient arm slidably contacting said spring engaging means along the length of said arm when said reel lock is rotated between said reel engaging and disengaging positions to urge said reel lock toward said reel engaging position.

10. The locking mechanism of claim 9, wherein said spring engaging means is positioned in spaced relationship to said reel lock and a predetermined distance therefrom; and said enlarged portion is at least as large as said predetermined distance to restrict rotation of said reel lock.

* * * * *

UNITED STATES PATENT AND TRADEMARK OFFICE
CERTIFICATE OF CORRECTION

PATENT NO. : 4,512,534
DATED : April 23, 1985
INVENTOR(S) : Don R. Coy, Jr., Peter M. Giannis It is certified that error appears in the above—identified patent and that said Letters Patent is hereby corrected as shown below:

On the cover page, column 1, immediately beneath "U.S. PATENT DOCUMENTS" the following citation should be included:

--3,672,603  6/1972  Swain  242/194--

Signed and Sealed this

Eighth Day of October 1985

[SEAL]

Attest:

*Attesting Officer*

DONALD J. QUIGG

*Commissioner of Patents and Trademarks—Designate*